US009338643B2

(12) United States Patent
Cahill

(10) Patent No.: US 9,338,643 B2
(45) Date of Patent: *May 10, 2016

(54) TELECOMMUNICATIONS DEVICE LOCALIZATION AND ALARM

(71) Applicant: Plantronics, Inc., Santa Cruz, CA (US)

(72) Inventor: Stephen V Cahill, Felton, CA (US)

(73) Assignee: Plantronics, Inc., Santa Cruz, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/265,079

(22) Filed: Apr. 29, 2014

(65) Prior Publication Data

US 2014/0302840 A1 Oct. 9, 2014

Related U.S. Application Data

(63) Continuation of application No. 12/821,013, filed on Jun. 22, 2010, now Pat. No. 8,750,855.

(51) Int. Cl.
*H04M 3/00* (2006.01)
*H04W 8/22* (2009.01)
*H04W 16/16* (2009.01)
*H04W 48/16* (2009.01)

(52) U.S. Cl.
CPC .............. *H04W 8/22* (2013.01); *H04W 16/16* (2013.01); *H04W 48/16* (2013.01)

(58) Field of Classification Search
CPC ....... H04W 48/16; H04W 8/22; H04W 16/16; H04M 1/6066; H04M 1/7253; H04M 1/72572
USPC ......................................................... 455/419
See application file for complete search history.

(56) References Cited

U.S. PATENT DOCUMENTS

| 5,684,859 | A * | 11/1997 | Chanroo et al. ............ 455/433 |
| 6,400,946 | B1 * | 6/2002 | Vazvan et al. ............ 455/432.1 |
| 7,260,395 | B1 * | 8/2007 | Hughes et al. ............ 455/432.2 |
| 2005/0282544 | A1 | 12/2005 | Oommen et al. |
| 2007/0111755 | A1 | 5/2007 | Seo et al. |
| 2007/0230420 | A1 | 10/2007 | Bumiller et al. |
| 2008/0194269 | A1 * | 8/2008 | Abernethy ............ G06Q 90/00 455/456.1 |
| 2008/0222021 | A1 * | 9/2008 | Stanforth et al. ............ 705/37 |
| 2009/0023434 | A1 | 1/2009 | Trainor et al. |
| 2009/0061861 | A1 * | 3/2009 | Buckley et al. ............ 455/433 |
| 2009/0067398 | A1 * | 3/2009 | Green et al. ............ 370/338 |
| 2010/0085935 | A1 | 4/2010 | Chin |
| 2011/0092208 | A1 * | 4/2011 | Swaminathan et al. ... 455/435.3 |
| 2011/0249631 | A1 * | 10/2011 | Li et al. ............ 370/329 |

OTHER PUBLICATIONS

International Search Report and Written Opinion mailed Aug. 31, 2011, in international application No. PCT/US2011/039329.

* cited by examiner

*Primary Examiner* — Timothy Pham
(74) *Attorney, Agent, or Firm* — Thomas L. Ewing

(57) ABSTRACT

A system for bringing a portable telecommunications device into compliance with local telecommunications requirements is described. Systems on the portable telecommunication device scan the local environment to determine if the operating characteristics of the portable telecommunication device are like those in the vicinity of the device or are different from those in the device's vicinity. If the communications characteristics of the portable telecommunication device are different from those in its immediate vicinity, then the portable telecommunications device undertakes one or more remedial actions to bring its operations into compliance with local telecommunications requirements.

35 Claims, 5 Drawing Sheets

| Devices | Channel | Time Slot | Band |
|---|---|---|---|
| DECT 203 | 118 | 2 | Not Approved |
| DECT 205 | 118 | 1 | Not Approved |
| DECT 207 | 512 | 3 | Approved |
| DECT 209 | 120 | 1 | Not Approved |
| DECT 211 | 120 | 3 | Not Approved |

| Devices | Channel | Time Slot | Band |
|---|---|---|---|
| DECT 203 | 118 | 2 | Approved |
| DECT 205 | 118 | 1 | Approved |
| DECT 207 | 512 | 3 | Not Approved |
| DECT 209 | 120 | 1 | Approved |
| DECT 211 | 120 | 3 | Approved | ly not permitted. Operating the# TELECOMMUNICATIONS DEVICE LOCALIZATION AND ALARM

CROSS-REFERENCE TO RELATED APPLICATIONS

This application is a continuation of U.S. Utility application Ser. No. 12/821,013, filed Jun. 22, 2010, titled "Telecommunications Device Localization & Alarm," the entire disclosure of which is hereby incorporated herein in its entirety.

FIELD

Embodiments of the invention relate to systems and methods that provide communications among devices in a telecommunications network. More particularly, embodiments of the invention relate to systems and methods in portable telecommunications devices that detect when such devices have been moved into a telecommunication network in which they have not been approved for operation and undertaking remedial actions of various types to ameliorate the problem.

BACKGROUND

Unified communications ("UC") represents an important component of productivity in contemporary business culture, and its success from company to company can serve as a bellwether indicator of the company's overall management success. An essential feature behind unified communications is the ability to have a single way for reaching an employee.

A headset device typically provides the glue that holds a UC system together. Using his headset, a user may typically access a variety of applications and systems available through his communication network. Communications to the headset are typically facilitated by a dongle of some sort that provides communications between the headset and a device providing network connectivity (e.g., a computer, a mobile phone).

A consumer (or other user) may easily transport a portable Digital Enhanced Cordless Telecommunications (DECT) device, such as a DECT dongle used in UC applications, into a new region where the device's frequency spectrum and/or power output have characteristics that cannot be legally used in the new region.

For example, transporting an EU-compliant DECT unit into North America is typically not permitted. Operating the European Union (EU) device in North America may cause severe problems with other telecommunications systems such as a local mobile telephone network. Assume in this example that a low-power (5 mW) EU-DECT system has been activated within a geography governed by North American telecommunications standards, e.g., a jurisdiction in which a North American cellular telephony network is legally operating. Although the EU-DECT device has relatively low power, the EU-DECT system may nevertheless cause a severe disruption in the quality of service for the portion of the North American system operating in close proximity to the EU-DECT system.

Interference from an EU-DECT unit operated in North America can occur, for example, in the Personal Communications Service (PCS) cellular handset transmit band, which is the PCS cellular base station's receive band. A PCS base station and PCS handsets typically use different frequency bands for transmit and receive, with one system's transmit band being the other system's receive band. The transmit band for a typical EU-DECT unit typically matches the PCS base station's receive band for all of the EU-DECT unit's radio signals. Thus, if the EU-DECT unit is close to a PCS cellular base station, even if the EU-DECT unit is low power, because it is close, the EU-DECT unit can deafen the PCS cellular base station to the transmissions of distant PCS cellular phones.

FIG. 1 illustrates a telecommunications network 100 comprising mobile phones 105-111 and a base station 103 which has come into the proximity of a non-compliant DECT unit 101a. The DECT unit 101a has been designed for communications with a headset 101b. (The DECT unit 101a may comprise a DECT dongle, for example.) The DECT unit 101a has a sufficiently strong power output that in communicating with the headset 101b, the DECT unit 101a subjects the base station 103 to interference. In other words, the DECT unit 101a inadvertently shares the same frequency band with the base station 103. For example, the base station 103 may comprise a PCS base station whose receive band matches the transmit band for the DECT unit 101a. The interference caused by the DECT unit 101a in the receive band of the base station 103 may render the base station 103 unable to receive signals from mobile phones 105-111, and the communications difficulties will increase the farther the mobile phones 105-111 are located from the base station 103. This situation can arise when, for example, an EU-DECT system (e.g., the DECT unit 101a-101b) is improperly brought into and operated in the North American PCS band, thus becoming an "interference emitting" wireless telecommunications system.

An end-user consumer associated with the headset 101b and the DECT unit 101a may not be aware of the interference to the base station 103 in the network 100, and the user is unlikely to be aware that his own unit is responsible for causing the interference. An operator of the network 100 will typically have to identify interfering units, such as the DECT unit 101a, and take overt actions to stop them from interfering with the network 100.

Dongle manufacturers have limited control over the post-sale movement of the portable telecommunications devices they produce and have limited abilities for preventing portable communications devices from being transported into unapproved areas. The only commercially deployed solution to this interference problem (typically caused by DECT-compliant units) has been to label the units (e.g., the DECT units 101a and 101b) according to the national market for which they are intended for operation and/or sold. This approach presumes that consumers will notice the labels and understand the national laws and requirements for any jurisdiction in which they might bring the DECT unit 101b and utilize only approved devices.

The approach above provides a working solution, of sorts, but unfortunately relies upon the end user's powers of observation and desire to do the right thing with no obvious financial or business benefits for compliance. Many consumers do not read the documentation that comes with their units or pay any attention to the warnings placed on their units. Consequently, labeling units for their intended market does not provide a complete solution to this problem. Additionally, given that the consumer's use of his non-compliant device is likely not interrupted, the primary motivation for a consumer to stop using his non-compliant DECT device relies primarily upon the better angels of the user's nature. Given that the cost of these non-compliant DECT devices is typically not trivial, one can assume that at least some consumers will not be willing to give up using their non-compliant devices for the good of an otherwise anonymous community of strangers.

Another proposed solution calls for adding global position system ("GPS") units into radio-based products to prevent them from being used around installations known for susceptibility to interference, such as military communications equipment and base stations. While many mobile phones include built-in GPS units, most headsets do not, and adding a GPS unit to headset or other telecommunication might significantly increase the price (e.g., double the price) for such devices. Consumers would likely balk at having to pay for GPS units for cordless telephones operating according to standards such as DECT. In short, this proposed solution is economically impractical unless and until the cost of GPS units becomes trivial. The solution also likely has implementation problems due to privacy issues.

Other solutions have proven equally inadequate or inappropriate for providing a robust unified communications system for devices capable of being transported in the proximity of networks where they are not authorized for operation. A simple and robust solution is called for in order to make unified communications more robust, ubiquitous, and compliant with various local, national, and regional laws and regulations.

SUMMARY OF THE INVENTION

Embodiments of the invention provide a system for bringing a portable telecommunications device into compliance with the telecommunications requirements of a new location. A signal scanner is configured to instruct a transceiver on the portable telecommunications device to scan a first set of frequencies associated with a plurality of local telecommunications devices and is configured to build a first data set of local telecommunications devices having telecommunications characteristics that do not satisfy a preset telecommunications characteristic set on the portable telecommunications device. The preset telecommunications characteristic set comprises operating allowances permitted by a telecommunications regulatory authority, and the portable telecommunications device has been set to operate according to the preset telecommunications characteristic set. A region logic unit is configured to determine if the first data set satisfies a compliance criterion and is configured to engage a remedial action if the first data set fails to satisfy the compliance criterion. The compliance criterion indicates the appropriateness of the preset telecommunications characteristic set in the new location.

In some embodiments of the invention, the transceiver scans a second set of frequencies to build a second data set of local telecommunications devices that satisfy preset telecommunications characteristics on the portable telecommunications device, and the compliance criterion applied by the region logic unit comprises comparing the first data set to the second data set and engaging the remedial action if the second data set exceeds the first data set.

Embodiments of the invention also provide a method for bringing a portable telecommunications device into compliance with telecommunications requirements in a new location. Scanning is conducted for signals from local telecommunications devices having characteristics outside those permitted by a preset telecommunications characteristic set on the portable telecommunications device. The preset telecommunications characteristic set comprises operating allowances permitted by a telecommunications regulatory authority, and the portable telecommunications device has been set to operate according to the preset telecommunications characteristic set. A first data set is stored based on results of scans for signals from local telecommunications devices outside those permitted by the preset telecommunications requirements. If the first data set is determined not to satisfy a compliance criterion, then a remedial action is performed. The compliance criterion indicates the appropriateness of the preset telecommunications characteristic set in the new location.

In some embodiments of the invention, a scan is conducted for signals having characteristics permitted by the preset telecommunications characteristic set on the portable telecommunications device. A second data set is stored based on results of scans for signals permitted by the preset telecommunications characteristic set. Determining if the first data set satisfies the compliance criterion comprises comparing the first data set against the second data set to determine if the first data set exceeds the second data set by a threshold amount.

BRIEF DESCRIPTION OF THE DRAWINGS

FIG. 1 illustrates a telecommunications network 100 comprising mobile phones 105-111 and a base station 103 which has come into the proximity of a non-compliant DECT unit 101a;

DETAILED DESCRIPTION OF AN EMBODIMENT OF THE INVENTION

Embodiments of the invention provide a method and system that enable a telecommunications device, especially a portable telecommunications device, to determine when it is being operated in a jurisdiction in which it has not been licensed for operation. Once the telecommunications device has determined that it may be operating in an unauthorized location, a variety of remedial actions can be undertaken. These remedial actions can be tailored to a set of remedial actions authorized by a national/regional telecommunications regulator and/or in accordance with an international standard related to such communications.

Embodiments of the invention may assist telecommunications equipment manufacturers avoid errors associated with attempting to comply with multiple national regulatory standards, especially for products built on the same production line but only localized at the end of production. Likewise, embodiments of the invention may assist telecommunications equipment manufacturers in preventing third parties from intentionally or unintentionally violating local and international telecommunications laws, standards, and/or regulations.

Embodiments of the invention may be applied to a variety of telecommunications devices and the related communications protocols upon which such devices operate. The example embodiments described herein pertain to devices communicating according to the Digital Enhanced Cordless Telecommunications (DECT) protocols (such as DECT dongles, DECT handsets, DECT headsets, and DECT base units), but embodiments of the invention are equally applicable to other telecommunications protocols, such as devices operating according to Bluetooth and 802.11.

Embodiments of the invention allow telecommunications devices operating according to one telecommunication standard (e.g., DECT) to determine if they have been moved into a non-approved jurisdiction and avoid interfering with other telecommunication devices (e.g., CDMA devices operating in the same frequency band) by surveying other nearby telecommunications devices operating on the same telecommunication standard (e.g., DECT).

Figures 2, 3:
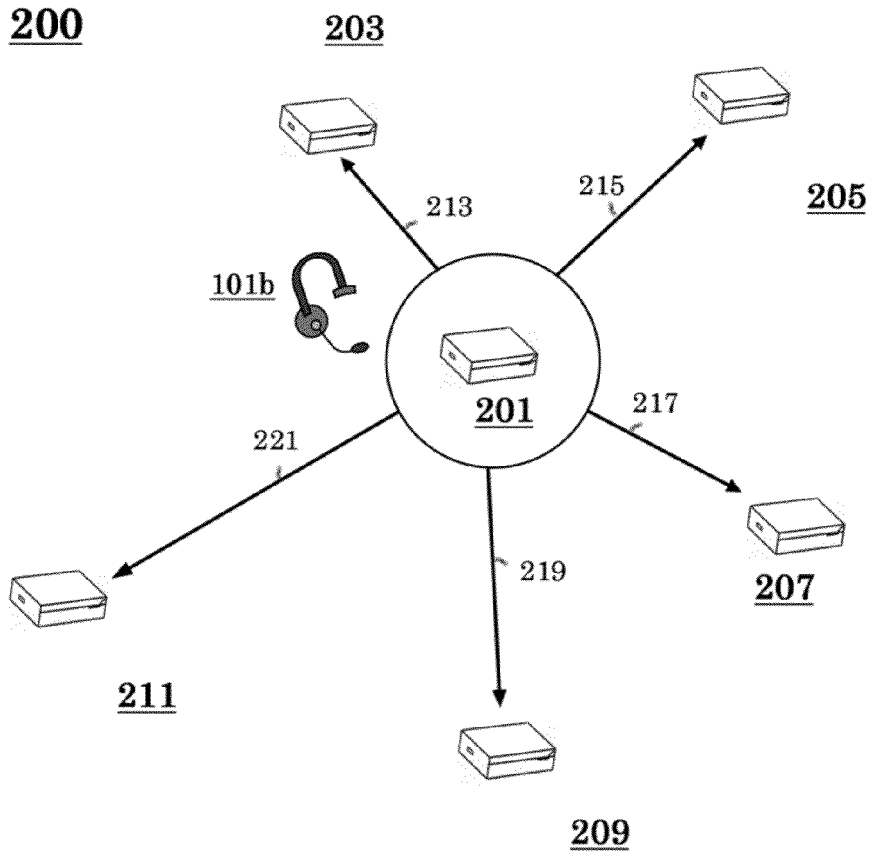
FIG. 2 illustrates a DECT unit 201 in a communications network 200, according to an embodiment of the invention.
FIG. 3 illustrates a portion of a table 300 compiled by the DECT unit 201 based upon the signal information returned from the DECT units 203-211 shown in FIG. 2, according to an embodiment of the invention.

FIG. 2 illustrates a DECT unit 201 in a communications network 200, according to an embodiment of the invention. The DECT unit 201 may comprise a DECT dongle or a DECT base, for example, operating with the DECT headset 101b. In an office or travel environment there are typically DECT units nearby so that a DECT unit can determine what bands the other DECT units in the area are using. The DECT unit 201 scans non-approved national bands for the presence of signals, according to an embodiment of the invention. The DECT unit 201 also conventionally scans for signals in its approved band to obtain the data for a local signal-strength table, also known as a Free Channel Map. As discussed below, embodiments of the invention do not necessarily require that the conventional scan be performed.

If the DECT unit 201 detects a non-approved signal, the DECT unit 201 will attempt to sync to the non-approved signal. If the DECT unit 201 can obtain a synch to the non-approved signal, then the DECT unit 201 marks the channel and timeslot occupied by the DECT signal for the non-approved national band.

With this information, the DECT unit 201 determines if there are DECT signals present in a non-approved national band. Based on the information related to other non-approved bands, the DECT unit 201 determines if the DECT unit 201 has been re-located into a non-approved region. The DECT unit 201 may apply various compliance criteria to the results of the scan data to determine if the DECT unit 201 has been relocated into a non-approved region. For example, in one embodiment of the invention, the DECT unit 201 applies a compliance criterion that comprises determining if non-approved signals in a non-approved band are more common than are approved signals in the band for which the DECT unit 201 has been approved, and if this is the case, then the DECT unit 201 may undertake one or more remedial actions, such as those discussed hereinbelow.

For example, assume the DECT unit 201 detects DECT signals from DECT units 203-211. As appropriate, the DECT unit 201 may attempt to sync to the DECT units 203-211 using signals 213-221. Some of the signals 213-221 may have approved characteristics according to the standard upon which the DECT unit 201 is operating and some signals 213-221 may not be approved for the standard in which the DECT unit 201 has been set to operate.

FIG. 3 illustrates a portion of a table 300 compiled by the DECT unit 201 based upon the signal information returned from the DECT units 203-211 shown in FIG. 2, according to an embodiment of the invention. Assume the DECT unit 201 has been built for operation in Europe and that the DECT unit 201 has only been certified for European operations. The DECT unit's survey of local signals, as shown in the table 300, shows four "not approved signals" and one "approved" signal. Accordingly, the DECT unit 201 could conclude that it has been re-located to a region other than the one (e.g., Europe) in which it has been approved for operation. For example, the DECT unit 201 may have been re-located to North America where the majority of the detected signals would be "not approved" rather than "approved," according to the European regulatory standards. As discussed below, the DECT unit 201 may apply other compliance criteria for determining when it has been re-located into a new environment.

The DECT unit 201 assesses the data in the table 300, determines that it is operating in a non-approved jurisdiction, and undertakes a remedial action. The DECT unit 201 could be designed to undertake any one of the remedial actions listed below, and could even be designed to undertake multiple remedial actions, according to an embodiment of the invention. For example, the DECT unit 201 could attempt one remedial action, and if that action fails, then the DECT until 201 could attempt another remedial action.

The DECT unit 201 may be designed to undertake at least one of these remedial actions, according to an embodiment of the invention:

A. Re-localize to a non-approved band;
B. Cease transmissions and notify the user of the problem;
C. Notify the user but continue operations;
D. Continue to operate but at a reduced power level;
E. Cease operations and ask the user to select the proper local standard;
F. Operate as normal only for a limited time period;
G. Do not allow out of band calling; and
H. Notify a central service about the problem.

The DECT unit 201 could be designed to re-localize to an apparently non-approved band (e.g., Remedial Action A above) in several ways. The DECT unit 201 could itself be designed for possible operation in a variety of bands associated with different telecommunications regulatory standards. The DECT unit 201 could come equipped with the necessary data for a variety of telecommunications standards as required by various national and/or regional telecommunications regulators, and the DECT unit 201 could automatically determine which new telecommunication standard to follow based on the predominate characteristics of the signals returned from nearby telecommunications devices. In addition to an automatic mode, the DECT unit 201 could also query the user to change the device's settings. For example, the user could be provided with functionality for changing a default band to an otherwise not approved band, e.g., a band approved for the location where the DECT unit 201 is actually located. In this embodiment, the user interface of the DECT unit 201 could be designed to inform the user of the band problem and instruct the user about how to change the DECT unit 201 to an appropriate band.

Alternatively, the DECT unit 201 could be sold with a second DECT unit(s) (e.g., a companion unit) that covers other bands, such as bands approved for operation in other jurisdictions. In this embodiment, the user interface of the DECT unit 201 informs the user of the problem and instructs the user about how to locate an appropriate DECT unit. For example, the DECT units could have different colors or different markings, with each color or marking appropriate for a different jurisdiction. The user interface of a European-approved DECT unit could instruct the user to begin using the DECT unit marked for operation in North America (e.g., "switch from the red-labeled unit to the green-labeled unit).

Figure 1:
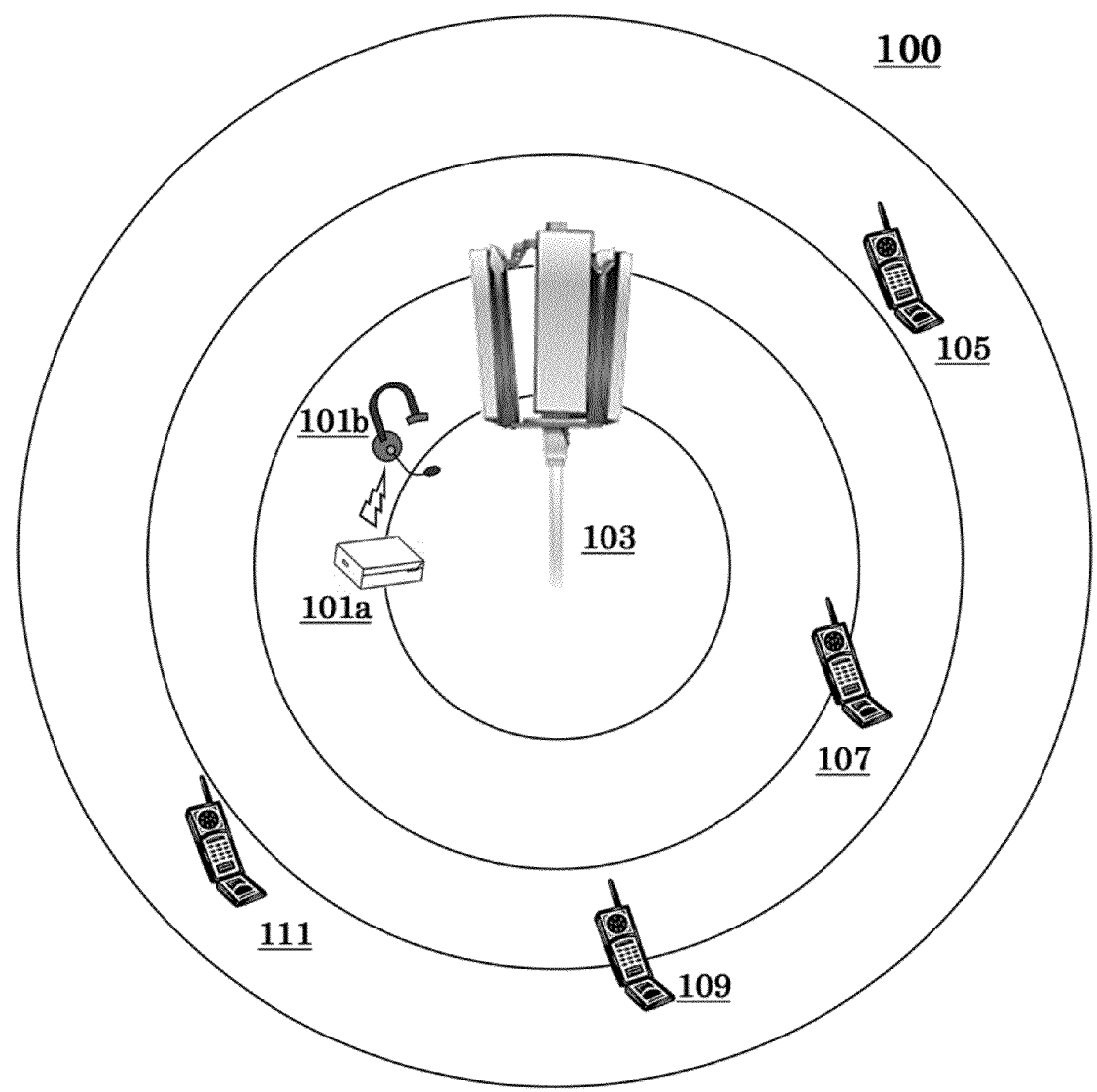

Ceasing transmissions and using the user interface to notify the user about the problem (e.g., Remedial Action B above) could be employed whether or not the DECT unit 201 is sold with other possibly appropriate DECT units. In other words, the DECT unit 201 could be designed to immediately stop making any interference that it might be causing to nearby communications devices, such as the PCS base station 103 shown in FIG. 1 and/or to other nearby devices that may be subject to interference from the DECT unit 201.

The DECT unit 201 could continue to operate with greatly-reduced transmit power (e.g., Remedial Action D above). In this embodiment, the DECT unit 201 could operate at a level sufficient to allow legal operation in bands other than the one for which the product was originally certified. The DECT unit's user interface could be designed to notify the user that operations will continue but at a greatly-reduced range due to apparent non-conformance with national/regional standards. The DECT unit 201 could be designed to periodically re-scan the environment to determine whether regular power should resume due to conformance with national standards; e.g., movement back into an acceptable region. Alternatively, the DECT unit 201 could be provided with a tool that the user could actuate to re-engage the sampling to determine national conformance.

The DECT unit 201 could send a notice (e.g., Remedial Action H above) of its own apparent non-compliance to a telecommunications authority (e.g., a major operating company and/or a telecommunications regulatory). According to some embodiments of the invention, the DECT unit 201 may have an Internet connection (via an associated personal computer, for example) that could be used to transmit the notice message. The DECT unit 201 may be associated with a headset that itself is compliant with a variety of telecommunications standards. The DECT unit 201 could be configured to send a notice message to its headset that then relays the notice message to a telecommunications authority, according to an embodiment of the invention.

Independent of these remedial actions, the DECT unit 201 may also operate in an advanced-user mode in which the device's user interface notifies the end-user of the presence, signal level, manufacturer's identification number (e.g., an electronic manufacturer's code ("EMC")), in-call status and other characteristics of the detected units having non-approved national band usage, according to an embodiment of the invention. The mode of such operation may depend on the manufacturer's identification number. Among other things, this embodiment would allow the user to scan for contraband devices that either he could report or that could be automatically reported by the user's telecommunication device. This operational mode could be expanded to include transfer of this data to a central service, such as one associated with a telecom operator and/or government regulator. This transfer would typically involve a communication path over another communication network, e.g., the Internet.

Figure 4:
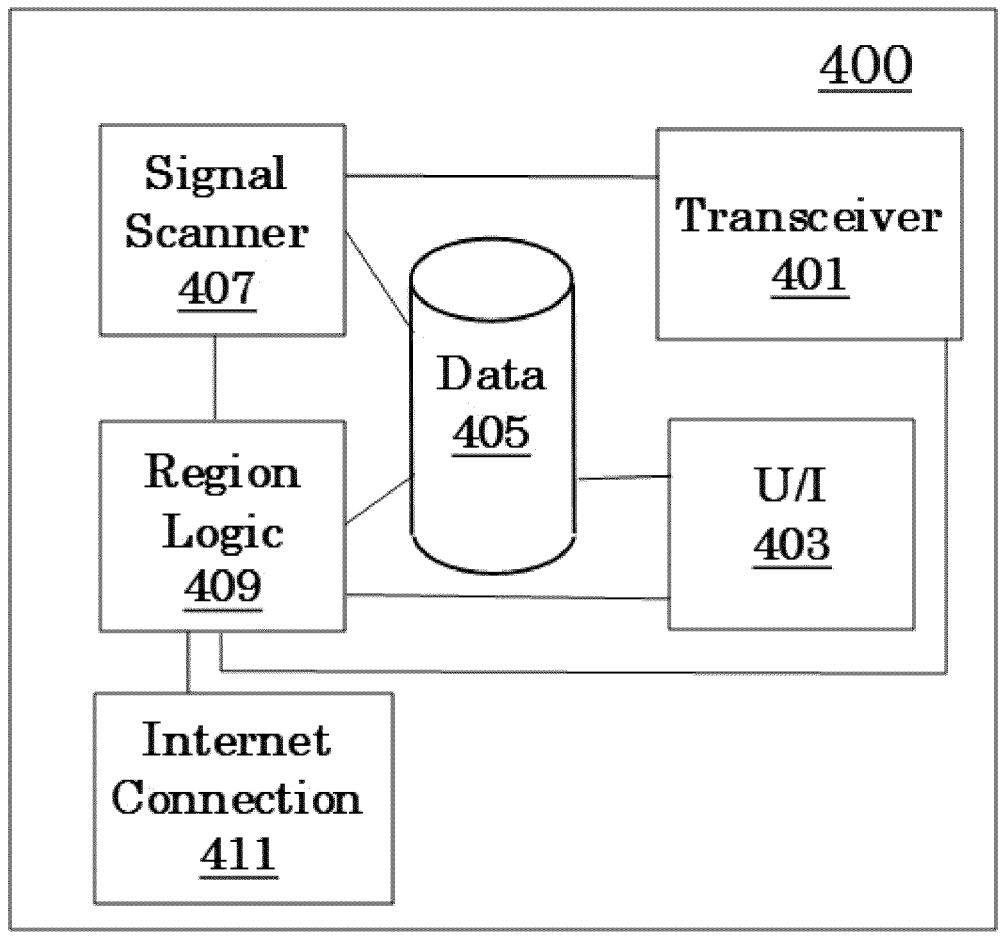
FIG. 4 illustrates a DECT unit 400, according to an embodiment of the invention.

FIG. 4 illustrates a DECT unit 400, according to an embodiment of the invention. In addition to the equipment conventionally found in a DECT unit, the DECT unit 400 includes a signal scanner 407 modified to scan non-approved frequencies as well as approved frequencies using transceiver 401. A transceiver otherwise suitable for a conventional DECT unit should function adequately with many embodiments of the invention. The signal scanner 407 may comprise a small program or firmware addition that directs the transceiver 401 to perform a task that it would not conventionally perform. A data repository 405 has been configured to store results provided to the signal scanner 407 by the transceiver 401. The data repository 405 may be configured to store a conventional Free Channel Map and also configured to store the additional data related to any non-approved frequencies detected by the transceiver 401, according to an embodiment of the invention. The DECT unit 400 may comprise a DECT dongle, a DECT headset, a DECT handset, or a DECT base, for example.

The signal scanner 407 notifies a region logic unit 409 when a scan has been completed. The region logic unit 409 is configured to examine the scan data stored in the data repository 405, such as the data of table 300 shown in FIG. 3, and determine whether the DECT unit 400 is operating in an approved region. The region logic unit 409 could be comprised of a microprocessor or other logic unit, such as a multiplexer, or series of logic units. The region logic unit 409 could be provided as hardware, software, or a combination of both.

Embodiments of the region logic unit 409 may apply different compliance criteria to determine if the DECT unit 400 has been relocated into an area not approved for operation. In one embodiment of the invention, the logic unit 409 compares the non-approved signals with the approved signals. For example, the logic unit 409 may examine the data in the table 300 and apply a compliance criterion that indicates non-compliance if the number of non-approved signals exceeds the number of approved signals.

In another embodiment of the invention, the logic unit 409 may apply a compliance criterion comprising determining if the percentage of approved signals to non-approved signals falls below predetermined threshold, e.g., 70%.

In still other embodiments of the invention, the region logic unit 409 may apply a compliance criterion that involves comparing the number of non-approved signals against a predetermined maximum (e.g., 3) to determine if the DECT unit 400 has been relocated into an area not approved for operation. As discussed, the region logic unit 409 does not necessarily need to consult data for approved signals in its application of a compliance criterion, according to an embodiment of the invention.

Appropriate compliance criterion may vary from jurisdiction to jurisdiction, and an ordinarily skilled artisan should be able to determine an appropriate compliance criterion for the region logic unit 409 based upon various intrinsic characteristics of the DECT unit and its intended operating environment.

If the region logic unit 409 determines by application of a compliance criterion that the DECT unit 400 is operating in a non-approved region, then the region logic unit 409 applies various remedial actions, such as those discussed hereinabove. For example, depending upon the set of remedial actions approved for the DECT unit 400, the region logic unit 409 may send a signal to the transceiver 401 turning off the device. The region logic unit 409 may also send a signal to a user interface 403 that initiates various remedial action scripts that may be presented to the user, according to an embodiment of the invention.

Figure 5:
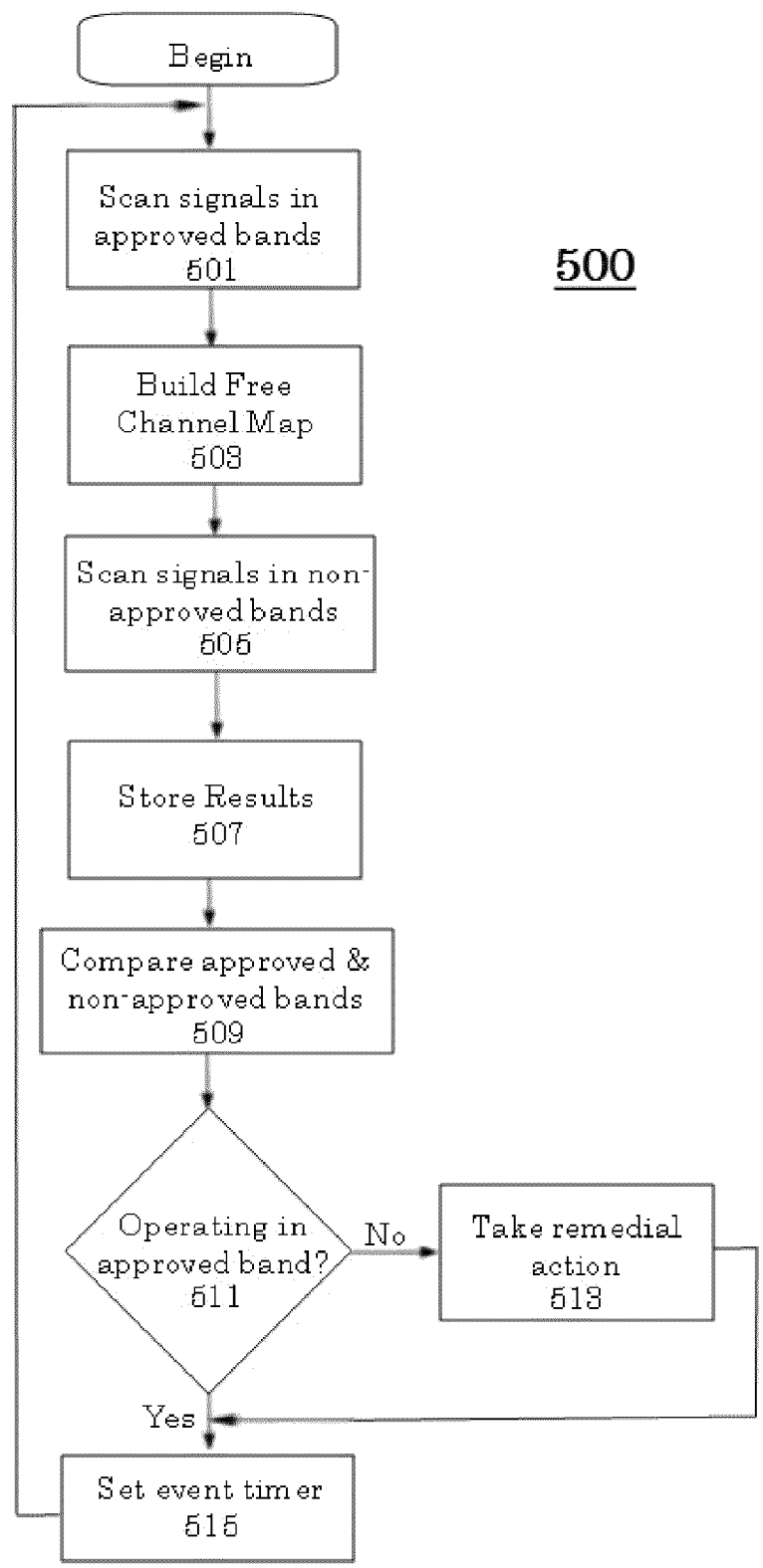
FIG. 5 illustrates a flowchart 500 that shows the steps involved in bringing a DECT unit into compliance with a given jurisdiction's communication standards, according to an embodiment of the invention.

In some embodiments of the invention, the DECT unit 400 includes an Internet connection 411. The Internet connection 411 may be used for sending external messages associated with the region logic unit 409 that are not sent over the transceiver 401. As discussed above, in an embodiment of the invention, the region logic unit 409 may notify a center server that the DECT unit 400 does not appear to be in compliance with local telecommunications regulations. The region logic unit 409 may provide the Internet connection 411 with the compliance notice, which is sent by the Internet connection 411 to the central server. For example, the Internet connection 411 may send a message to the central server via a personal computer to which the DECT unit 400 is attached (physically or electronically) or becomes attached. The Internet connection 411 may be helpful for a variety of conventional functions associated with the DECT unit 400. The Internet connection 411 is otherwise of a conventional configuration as understood by an ordinary artisan and can be constructed of hardware and/or software elements.

FIG. 5 illustrates a flowchart 500 that shows the steps involved in bringing a DECT unit into compliance with a given jurisdiction's communication standards, according to an embodiment of the invention.

Flowchart 500 shows a DECT unit, such as the DECT unit 400 of FIG. 4, using its transceiver to scan for signals in the approved bands (Step 501). The DECT unit uses the data returned to construct a Free Channel Map of the available channels in the approved bands (Step 503). The results may be stored as they arrive rather than retained until the scanning has been completed. As shown in FIG. 4, the signal scanner 407 may work with the transceiver 401 to build the data which is shown in the data repository 405, which may include data such as that shown as table 300 in FIG. 3. A DECT unit may be conventionally configured to perform Steps 501-503 as part of its normal operations. However, Steps 501-503 are not needed in some embodiments of the invention. For example, in some embodiments of the invention, the DECT unit scans just for the seemingly unapproved signals (Steps 505-507 below) and determines based on the number of seemingly unapproved signals detected whether it has been moved into a location where its operations are not approved.

The DECT unit uses its transceiver to scan for signals in non-approved bands (Step 505). The DECT unit stores the results of the scan (Step 507). The results may be stored as they arrive rather than retained until the scanning has been completed. As shown in FIG. 4, the signal scanner 407 may work with the transceiver 401 to build the data which is shown in the data repository 405, which may include data such as that shown as table 300 in FIG. 3.

In some embodiments of the invention, Step 501 and Step 505 may be performed concurrently and Step 503 and Step 507 may also be performed concurrently. Also, as discussed above, in some embodiments of the invention, Steps 501-503 may be omitted, especially when the DECT unit's compliance criterion comprises a comparison involving only non-approved signals.

The DECT unit compares the approved and the non-approved bands in the local vicinity of the DECT unit, e.g., the DECT unit 400 (Step 509). Using the results of this comparison, the DECT unit determines by application of a compliance criterion if the DECT unit is operating in an approved or non-approved band (Step 511). For example, as discussed with respect to FIG. 4, the Region Logic 409 may use the data stored in the data repository 405 in testing adherence to the compliance criterion.

If the DECT unit determines that it is not operating in an approved band (Step 511), then the DECT unit undertakes one or more remedial actions (Step 513). Once the remedial actions have been completed, then the DECT unit may set an event timer that re-starts the scanning process either after a selected time interval and/or once a given event occurs (Step 515). Events that could re-engage the scanning process could include switching the DECT unit from an off position to an on position and/or the engagement of a scan process by the user. As shown in FIG. 4, the Region Logic 409 undertakes these actions with the User Interface 403.

As discussed above, the DECT unit may be designed to undertake any of these remedial actions, according to an embodiment of the invention:

A. Re-localize to a non-approved band;
B. Cease transmissions and notify the user of the problem;
C. Notify the user but continue operations;
D. Continue to operate but at a reduced power level;
E. Cease operations and ask the user to select the proper local standard;
F. Operate as normal for a limited time period;
G. Do not allow out of band calling; and
H. Notify a central service about the problem.

If the DECT unit determines that it is operating in an approved band (Step 511), then the DECT unit may set an event timer that either re-starts the scanning process at a selected interval and/or re-starts the scanning process once a given event occurs (Step 515).

Figures 6, 7:
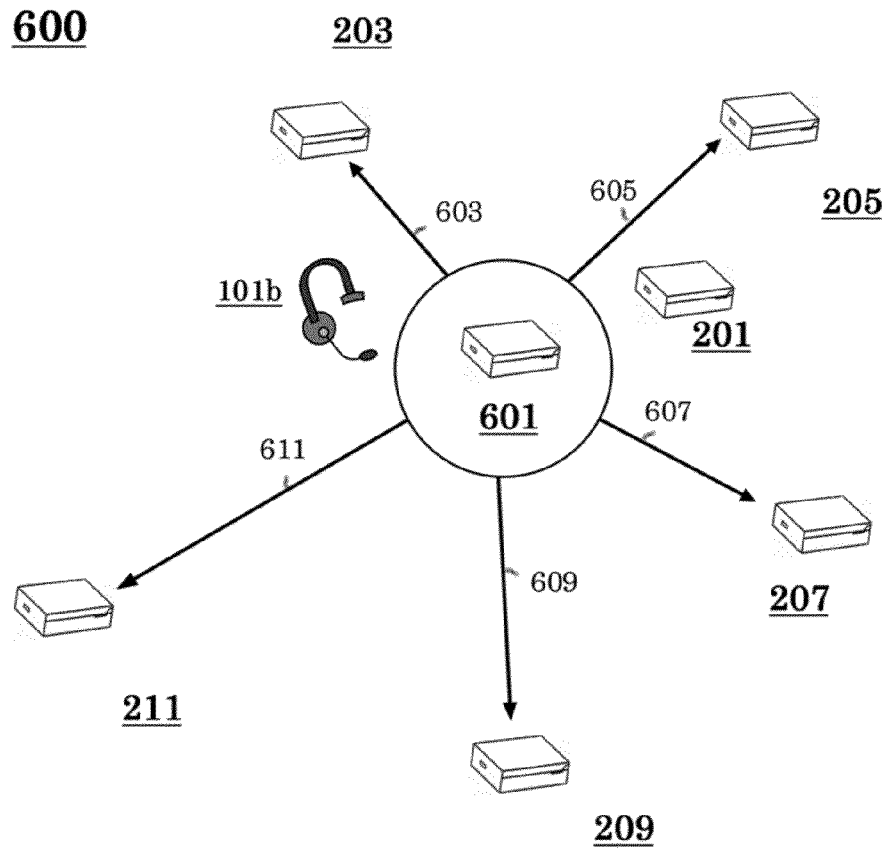
FIG. 6 illustrates a system 601 comprising a headset 101b, a DECT unit 201, and a DECT unit 601, according to an embodiment of the invention.
FIG. 7 illustrates a portion of a table 700 composed by the DECT unit 601, shown in FIG. 6, based upon the signal information returned from the DECT units 203-211, according to an embodiment of the invention.

FIG. 6 illustrates a system 601 comprising a headset 101b, a DECT unit 201, and a DECT unit 601 in a network 600, according to an embodiment of the invention. The headset 101b and the DECT unit 201 may be the same units as shown in FIG. 2. The DECT unit 601 may comprise a DECT dongle that has been configured for operation in a different telecommunications region than the DECT unit 201, for example.

In this embodiment of the invention, the DECT unit 201 has produced the table 300 as shown in FIG. 3 and determined using a compliance criterion that it has been re-located into a jurisdiction where it is likely not in regulatory compliance. The DECT unit 201 has engaged a remedial action that includes, among other things, having the user interface on the DECT unit 201 instruct the user to turn off the DECT unit 201 and turn on the DECT unit 601. The DECT unit 601 has been designed for a different regulatory environment than the DECT unit 201, e.g., the DECT unit 201 is designed for application in Europe and the DECT unit 601 is designed for application in North America.

Once switched on, the DECT unit 601 locates the DECT signals in its environment and determines whether there are more devices in approved bands than in non-approved bands. For example, assume the DECT unit 601 detects DECT signals from the DECT units 203-211. Just as the DECT unit 201 did in FIG. 2, the DECT unit 601 may attempt to sync to the DECT units 203-211 using signals 603-611.

FIG. 7 illustrates a portion of a table 700 composed by the DECT unit 601, shown in FIG. 6, based upon the signal information returned from the DECT units 203-211, according to an embodiment of the invention. Assume the DECT unit 601 has been built for operation in North America. The DECT unit's survey of local signals, as shown in the table 700, shows four approved signals and one not approved signal—the opposite of the results detected by the DECT unit 201 and shown in FIG. 3. Accordingly, the DECT unit 601 could conclude that it is located in a region in which it was designed for operation.

As an alternative embodiment, the DECT unit 201 and the DECT unit 601 may be combined into a single device. This combination would allow users to remain compliant while traveling across multiple telecommunications regions. The combination unit may be designed to operate in an automatic mode without requiring user intervention. The combined device might possibly be more expensive than dongles certified for just a single jurisdiction.

While some national regulators might be disinclined to certify a single dongle for auto-selection for compliance with national standards based on the predominance in the immediate vicinity of one type of unit or another, other telecommunications regulators may be willing to certify a dual-mode unit that requires user-intervention to set the national standard if it appears to be in the presence of mostly non-standard devices. Embodiments of the invention provide for communal management of a problem with transnational dongles that otherwise has no practical solution.

In still further embodiments of the invention, the frequency scanning system may be configured to look for signals other than those related to DECT systems. For example, the devices may look for signals such as Bluetooth signals, 802.11 signals and/or PCS signals, or in general signals representing the potentially-interfered service, or signals that are specific to and identify a regional regulatory region.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. For example, embodiments of the invention apply to all portable DECT devices for which the headset, handset, the base, and/or other portable equipment may be moved. Consequently, embodiments of the invention are applicable to portable pairs of DECT base/headset. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

I claim:

1. A system for correcting a portable telecommunications device operating according to the Digital Enhanced Cordless Telecommunications (DECT) protocol that is non-compliant with telecommunications requirements in a second location, comprising:
 a signal scanner configured to instruct a transceiver on the portable telecommunications device to scan a first set of frequencies associated with a plurality of local telecommunications devices and configured to build a first data set of local telecommunications devices having telecommunications characteristics that do not satisfy a preset telecommunications characteristic set on the portable telecommunications device, wherein the portable telecommunication device has been configured for operation in compliance with telecommunications requirements for DECT devices operating in a first location and wherein the second location is without a facility for broadcasting the telecommunications requirements for DECT-compliant portable devices operating in the second location, wherein the preset telecommunications characteristic set comprises operating allowances permitted by a telecommunications regulatory authority associated with the first location and wherein the portable telecommunications device has been set to operate according to the preset telecommunications characteristic set; and
 a region logic unit configured to determine if the first data set satisfies a compliance criterion of the first location and configured to engage a remedial action if the first data set fails to satisfy the compliance criterion, wherein the compliance criterion indicates appropriateness of the preset telecommunications characteristic set in the first location.

2. The system of claim 1 wherein the region logic unit is further configured to perform the remedial action by:
 reviewing the first data set to determine a common set of telecommunications characteristics among the local telecommunications devices in the first data set;
 identifying a new telecommunication regulatory standard for DECT-compliant portable devices operating in the second location, wherein the new telecommunication regulatory standard comprises a telecommunication regulatory standard approved for use in the second location; and
 re-setting the portable telecommunications device to operate within allowances permitted by the new telecommunication regulatory standard.

3. The system of claim 1 wherein the region logic unit is further configured to perform the remedial action by instructing the transceiver on the portable telecommunications device to shut down.

4. The system of claim 3 wherein the region logic unit is further configured to perform the remedial action by instructing a user interface on the portable telecommunications device to notify a user that the portable telecommunications device has been shut down because the portable telecommunications device does not comply with local telecommunications regulations.

5. The system of claim 1 wherein the region logic unit is further configured to perform the remedial action by instructing the transceiver on the portable telecommunications device to reduce power output.

6. The system of claim 5 wherein the region logic unit is further configured to perform the remedial action by instructing a user interface on the portable telecommunications device to notify a user that the portable telecommunications device has reduced its power output because the portable telecommunications device does not comply with local telecommunications regulations.

7. The system of claim 5 wherein the transceiver is configured to reduce power output to a minimum required to maintain communications with a headset unit associated with the portable telecommunications device.

8. The system of claim 1 wherein the region logic unit is further configured to perform the remedial action by instructing a user interface on the portable telecommunications device to request a user to select a new set of telecommunications characteristics for the portable telecommunications device that complies with local telecommunications regulations.

9. The system of claim 1 wherein the region logic unit is further configured to perform the remedial action by instructing the transceiver in the portable telecommunications device to shut off after a preset amount of time and instructing a user interface on the portable telecommunications device to notify a user of the portable telecommunications device that the portable telecommunications device will cease operations after the preset amount of time.

10. The system of claim 1 wherein the region logic unit is further configured to perform the remedial action by instructing the transceiver in the portable telecommunications device to stop making out of band calls.

11. The system of claim 10 wherein the regional logic unit instructs a user interface on the portable telecommunications device to notify a user of the portable telecommunications device that out of band calls can no longer be made because the portable telecommunications device does not comply with local telecommunications regulations.

12. The system of claim 1 wherein the region logic unit is further configured to perform the remedial action by sending a notification message to an external service, wherein the notification message states that the portable telecommunications device does not comply with local communications requirements.

13. The system of claim 1 wherein the region logic unit is further configured to perform the remedial action by instructing the transceiver in the portable telecommunications device to shut off and instructing a user interface on the portable telecommunications device to notify a user of the portable telecommunications device to switch to a companion telecommunications device that complies with appropriate telecommunications regulations.

14. The system of claim 1 wherein the region logic unit is configured to send an alert message over the transceiver in the portable telecommunications device to a central service, wherein the alert message includes identification information for local telecommunications devices that adhere to different local standards than the telecommunications device.

15. The system of claim 1 wherein the compliance criterion applied by the region logic unit comprises determining if the first data set contains more than a threshold number of telecommunications devices.

16. The system of claim 15 wherein the threshold number of telecommunications devices is one of one telecommunication device, two telecommunications devices, and three telecommunications devices.

17. The system of claim 1 wherein the signal scanner is further configured to instruct the transceiver to scan a second set of frequencies to build a second data set of local telecommunications devices that satisfy preset telecommunications characteristics on the portable telecommunications device, and wherein the compliance criterion applied by the region logic unit comprises comparing the first data set to the second data set and engaging the remedial action if the second data set exceeds the first data set.

18. The system of claim 1 wherein the signal scanner is further configured to instruct the transceiver to scan a second set of frequencies to build a second data set of local telecommunications devices that satisfy preset telecommunications characteristics on the portable telecommunications device, and wherein the compliance criterion applied by the region logic unit comprises determining if the first data set as a percentage of the second data set exceeds a threshold number.

19. The system of claim 18 wherein the threshold number is 70 percent.

20. The system of claim 1 wherein the local devices operate according to one of DECT, Bluetooth, and 802.11.

21. The system of claim 1 wherein the portable telecommunications device is one of a DECT dongle and a DECT base unit.

22. A method for correcting a portable telecommunications device operating according to the Digital Enhanced Cordless Telecommunications (DECT) protocol that is non-compliant with telecommunications requirements in a second location, the method comprising:
  scanning for signals from local telecommunications devices having characteristics outside those permitted by a preset telecommunications characteristic set on the portable telecommunications device, wherein the portable telecommunication device has been configured for operation according to telecommunications requirements of a first location, wherein the second location is without a facility for broadcasting the telecommunications requirements for DECT-compliant portable devices operating in the second location, wherein the preset telecommunications characteristic set comprises operating allowances permitted by a telecommunications regulatory authority of the first location and wherein the portable telecommunications device has been set to operate according to the preset telecommunications characteristic set;
  storing a first data set based on results of scans for signals from local telecommunications devices outside those permitted by the preset telecommunications requirements;
  determining if the first data set satisfies a compliance criterion, wherein the compliance criterion indicates appropriateness of the preset telecommunications characteristic set in the first location; and
  performing a remedial action if the portable telecommunications device fails to satisfy the compliance criterion of the first location.

23. The method of claim 22 wherein determining if the first data set satisfies the compliance criterion comprises determining if the first data set contains more than a threshold number of telecommunications devices.

24. The method of claim 23 wherein the threshold number of telecommunication devices is one of one telecommunication device, two telecommunications devices, and three telecommunications devices.

25. The method of claim 22, further comprising:
  scanning for signals having characteristics permitted by the preset telecommunications characteristic set on the portable telecommunications device; and
  storing a second data set based on results of scans for signals permitted by the preset telecommunications characteristic set;
  wherein determining if the first data set satisfies the compliance criterion comprises comparing the first data set against the second data set to determine if the first data set exceeds the second data set by a threshold amount.

26. The method of claim 25 wherein the threshold amount comprises at least one telecommunication device.

27. The method of claim 22, further comprising:
  scanning for signals of telecommunications devices having characteristics permitted by the preset telecommunications characteristic set; and
  storing a second data set based on results of scans for signals of telecommunications devices permitted by the preset telecommunications characteristic set;
  wherein determining if the first data set satisfies the compliance criterion comprises determining if the first data set as a percentage of the second data set exceeds a threshold number.

28. The method of claim 27 wherein the threshold number is 70 percent.

29. The method of claim 22 wherein the remedial action performed comprises at least one of re-localizing the portable telecommunications device to a new band; ceasing transmissions from the portable telecommunications device; notifying a user associated with the portable telecommunications device that the portable telecommunications device does not comply with local communications requirements; reducing power output from the portable telecommunications device; asking a user associated with the portable telecommunications device to select the proper local standard; operating the portable telecommunications device in a normal mode for a limited time period; disabling the portable telecommunications device for out of band calling; and notifying a central service that the portable telecommunications device does not comply with local communications requirements.

30. The method of claim 22, further comprising:
  scanning for signals of telecommunications devices having characteristics permitted by the preset telecommunications characteristic set; and
  storing a second data set based on results of scans for signals of telecommunications devices permitted by the preset telecommunications characteristic set;

wherein determining if the first data set satisfies the compliance criterion comprises:
subtracting a number of telecommunications devices in the second data set from a number of telecommunications devices in the first data set to determine a difference;
determining if the difference is a positive or negative number; and
requesting a remedial action if the difference is a negative number.

31. The method of claim 22, further comprising:
scanning for signals of telecommunications devices having characteristics permitted by the preset telecommunications characteristic set; and
storing a second data set based on results of scans for signals of telecommunications devices permitted by the preset telecommunications characteristic set;
wherein determining if the first data set satisfies the compliance criterion comprises dividing a number of telecommunication devices in the second data set by a number of telecommunication devices in the first data set to determine a ratio; and
requesting a remedial action if the ratio is greater than a predetermined amount.

32. The method of claim 31 wherein the predetermined amount is one.

33. The method of claim 22 wherein the local devices operate according to one of Digital Enhanced Cordless Telecommunications (DECT), Bluetooth, and 802.11.

34. The method of claim 22 wherein the remedial action performed comprises notifying a user associated with the portable telecommunications device that the portable telecommunications device does not comply with local communications requirements and instructing the user to switch to a companion telecommunications device that complies with appropriate telecommunications regulations.

35. The method of claim 22 further comprising:
sending the second data set to a telecommunications compliance office associated with the second location.

* * * * *